United States Patent [19]

Etra

[11] 3,899,641

[45] Aug. 12, 1975

[54] FOUR-WIRE BACKUP FACILITY USING DDD LINES

[75] Inventor: Richard Henry Etra, Highland Park, N.J.

[73] Assignee: Bell Telephone Laboratories, Incorporated, Murray Hill, N.J.

[22] Filed: Mar. 4, 1974

[21] Appl. No.: 447,476

[52] U.S. Cl. ........ 179/18 EA; 179/2 DP; 178/69 G; 340/147 SC

[51] Int. Cl.$^2$ .......................................... H04Q 1/24

[58] Field of Search ........... 179/18 EA, 2 DP, 81 R, 179/84 R; 340/147 C, 147 SC; 178/69 G; 333/3

[56] References Cited

UNITED STATES PATENTS 3,001,027 9/1961 Armstrong ..................... 179/18 EA

*Primary Examiner*—William C. Cooper
*Attorney, Agent, or Firm*—Donnie E. Snedeker

[57] ABSTRACT

A pair of two-wire DDD lines are used as automatically switched backup for a four-wire private line data link from a central station to a remote station. Transfer to the backup facility is effected automatically at the remote station upon detection of failure of the four-wire link, provided the two DDD lines are dialed-up in a predetermined sequence within a predetermined time of each other. This precludes accidental or unwanted transfer to the backup DDD lines upon momentary failure of the four-wire link or upon improper (e.g., wrong number) incoming calls on the DDD lines.

11 Claims, 1 Drawing Figure

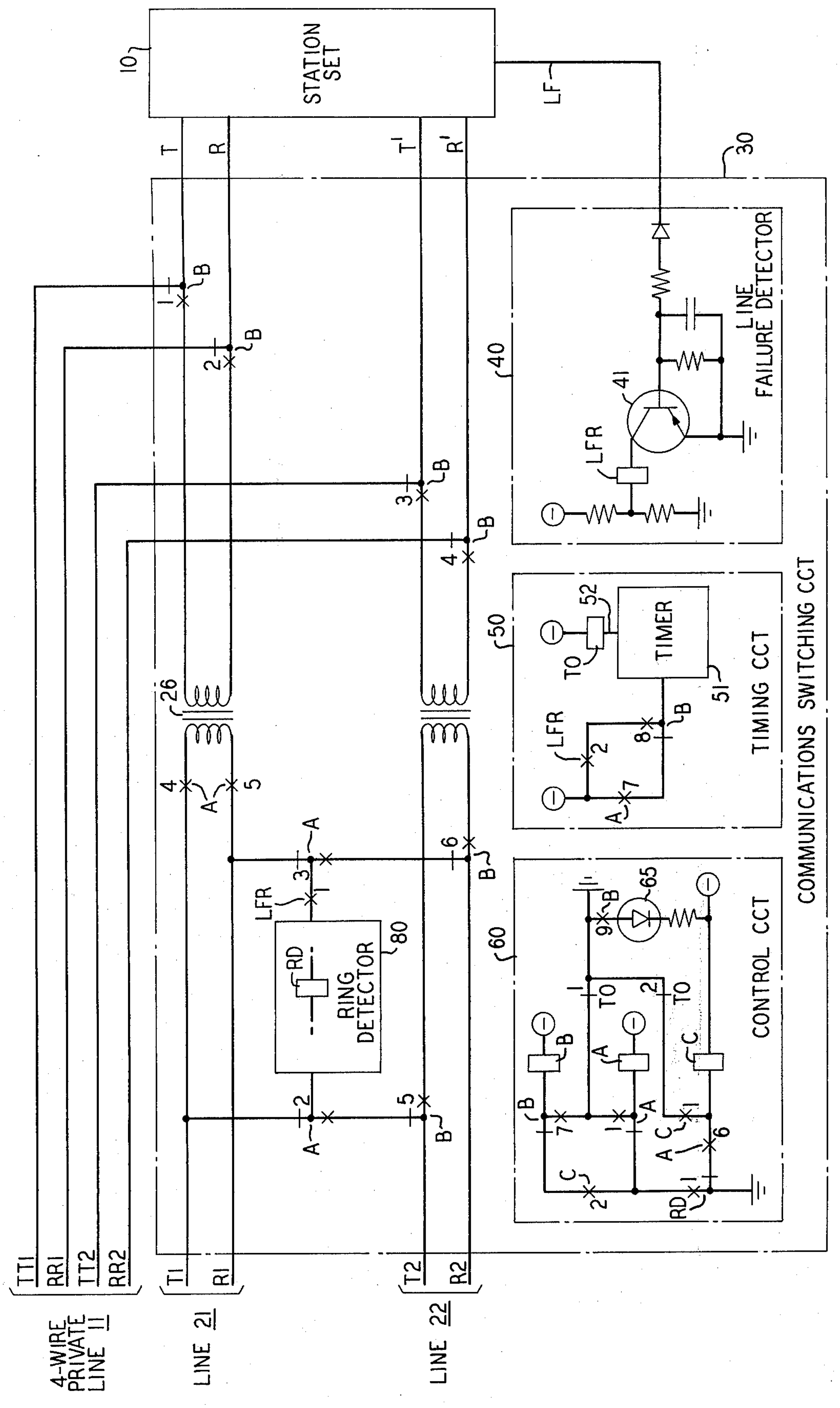
STATION SET
10
LF
30
LINE FAILURE DETECTOR
40
41
LFR
TIMING CCT
50
TIMER
51
52
TO
CONTROL CCT
60
65
COMMUNICATIONS SWITCHING CCT
RING DETECTOR
RD
80
26
4-WIRE PRIVATE LINE 11
TT1
RR1
TT2
RR2
LINE 21
T1
R1
LINE 22
T2
R2
T
R
T'
R'

FOUR-WIRE BACKUP FACILITY USING DDD LINES

BACKGROUND OF THE INVENTION

This invention relates to a communications switching circuit and, more particularly, to a switching circuit for use in connection with backup facilities for a private line communication system.

Private line communication systems are widely used for providing direct two-wire or four-wire connection between two or more private line stations. For example, four-wire private lines may be provided between a central station and each of a plurality of remote data gathering or telemetry stations. Manifestly, the very nature of the usual applications of such private line connections demands substantial continuity of satisfactory performance. Failure of the line connection or even temporary unsatisfactory performance may have very serious consequences.

It will be apparent that an additional private line can be provided for backup in case of failure of the primary private line connection, along with arrangements for switching to the backup private line either manually or automatically. However, additional private lines for backup are not always readily available and are relatively expensive, particularly where the stations are separated by substantial distances. Thus, it would be desirable to provide such backup facilities for private lines by using the existing automatiic direct distance dialing (DDD) network, a pair of conventional dialed-up telephone lines serving as backup for a four-wire private line. Furthermore, since one or more of the private line stations may be unattended, it would be desirable to effect transfer to the dialed-up lines automatically upon failure of the private line.

SUMMARY OF THE INVENTION

Accordingly, it is a general object of this invention to provide simple, economical and reliable private line backup facilities using the DDD telephone switching network.

More particularly, it is an object of this invention to automatically provide an alternative four-wire connection path between two private line stations by using a pair of dialed-up two-wire telephone lines.

It will be recognized that use of the switched telephone network increases the possibility of accidental or unwanted interference, such as from wrong number calls to the backup DDD telephone lines. Thus, a further object of this invention is to economically provide reasonable security against such accidental or unwanted transfer of a station from its private line connection.

In accordance with a specific illustrative embodiment of the invention, a communications switching circuit is provided for use at a four-wire private line station, which is operative upon failure of the private line for transferring the station connection to a pair of conventional two-wire telephone lines. Transfer from the private line to the backup telephone lines is effected only upon failure of the private line and only if, subsequent thereto, each of the two backup lines are dialed up in a predetermined sequence and within a predetermined time frame. This effectively precludes accidental or unwanted transfer to the backup facilities upon momentary failure of the private line or due to improper incoming calls on the backup telephone lines. Termination of the switched telephone line connections by a calling station hanging up, or due to failure of one or both of the backup lines, advantageously results in automatic restoration of the private line connection.

BRIEF DESCRIPTION OF THE DRAWING

The above and other objects and features of the present invention may be fully apprehended from the following detailed description when considered with reference to the accompanying drawing which shows an illustrative embodiment of a backup facility for use at an unattended four-wire private line station in accordance with the principles of the invention.

DETAILED DESCRIPTION

The illustrative embodiment of the invention shown in the drawing is depicted, as mentioned above, for use with a private line station set 10 which is connected to another private line station (not shown) over a four-wire private line 11 comprising leads TT1, RR1, TT2 and RR2. Thus, the normal communications path for station set 10 is via station leads T, R, T′ and R′ connected to private line 11 through the break portions of transfer contacts 1–4 of relay B. Station set 10 may be, for example, an unattended remote data gathering station connected over line 11 to a central private line station, which may be attended or not depending upon the particular application.

Station set 10 also has associated therewith a pair of two-wire dial-up telephone lines 21 and 22 for providing a backup communications path in the event of failure of private line 11. Should private line 11 fail or otherwise provide unsatisfactory performance, communications switching circuit 30 is operative for transferring station set 10 from private line 11 to backup lines 21 and 22. Thus, operation of switching circuit 30 in the manner described below disconnects station leads T and R from private line 11 and connects them to tip and ring leads T1 and R1 of line 21. At the same time, station leads T′ and R′ are disconnected from private line 11 by switching circuit 30 and are connected to tip and ring leads T2 and R2 of line 22.

In accordance with my invention, transfer from private line 11 to backup lines 21 and 22 is preferably effected only upon failure of private line 11. Line failure detector 40 is provided for this purpose in communications switching circuit 30. Furthermore, transfer of station set 10 to backup lines 21 and 22 is effected advantageously only if, during failure of private line 11, incoming calls are detected on lines 21 and 22, ilustratively by use of ring detector 80. Such incoming calls must occur on lines 21 and 22 in a predetermined sequence and within a predetermined time frame, as determined by timing circuit 50 and control circuit 60. In the illustrative embodiment in the drawing, ringing must be detected first on line 21, followed by detection of ringing on line 22 within a fixed interval of time, e.g., 30 seconds, determined by timer 51. This effectively prevents accidental or unwanted transfer to backup lines 21 and 22 upon momentary failure of private line 11 or due to improper incoming calls on lines 21 and 22.

With the above description in mind, consider now the operation of communications switching circuit 30 in transferring station set 10 from private line 11 to backup lines 21 and 22 upon failure of line 11. Failure of line 11 is indicated to switching circuit 30 by a predetermined line failure signal from station set 10 over lead LF. Existing station sets provide such a line failure signal, for example, upon cessation of the line carrier signal, such as due to a break in private line 11 or due to the other station hanging up because of unsatisfactory performance of the line.

Responsive to a line failure signal on lead LF, line failure relay LFR in detector 40 is energized. Illustratively for this purpose, the line failure signal on lead LF renders transistor 41 conducting, completing an obvious path from battery through the winding of relay LFR and through transistor 41 to ground. Operation of line failure relay LFR closes to make contact 1, connecting ring detector 80 across leads T1 and R1 of line 21 through the break portions of transfer contacts 2 and 3 of relay A. Make contact 2 of relay LFR also closes in timing circuit 50 but is not used at this time.

Ring detector 80 includes ring detector relay RD and may comprise any of the well-known arrangements for detecting ringing current applied to a telephone line, the detection of ringing current operating relay RD. Ring detector 80 remains connected to line 21 until a ringing signal is detected on line 21 or until a line carrier signal is returned to private line 11. Should carrier return on line 11 at any time prior to cut-through to backup lines 21 and 22, such as in the case of a momentary failure of line 11, the line failure signal is removed from lead LF, releasing relay LFR and disconnecting ring detector 80 from line 21. Assume, however, that the failure of private line 11 persists and that a call to station set 10 is initiated over the backup facilities. Assume further, that the telephone number associated with line 21 is dialed manually or automatically from another station set (not shown), typically the other station set connected to private line 11, and that responsive thereto ringing current is applied to line 21 in the normal manner.

The ringing current on line 21 is detected by ring detector 80, operating ring detector relay RD. Transfer contact 1 of relay RD operates to complete a path through the make portion thereof from ground, through the break portion of transfer contact 1 of relay A, and through the winding of relay A to battery. Relay A operates in this path, its transfer contact 1 providing a hold path through the make portion thereof and through break contact 1 of relay TO to ground. Ring detector 80 is disconnected from line 21 and connected to line 22 by the operation of transfer contacts 2 and 3 of relay A. At the same time, make contacts 4 and 5 of relay A close to interconnect the tip and ring leads T1 and R1 of line 21 through a winding of line transformer 26, thereby tripping ringing on line 21 in the usual fashion.

Closure of make contact 6 of relay A in control circuit 60 completes a path for energizing relay C. This path may be traced from ground through the break portion of transfer contact 1 of relay RD, make contact 6 of relay A, and the winding of relay C to battery. Make contact 1 of relay C operates to provide a holding path for relay C through break contact 2 of relay TO to a ground. Make contact 2 of relay C closes to prepare a path for subsequent energization of relay B upon detection of ringing on line 22.

Ring detector 80 remains connected across the tip and ring leads T2 and R2 of line 22, assuming failure of line 11 continues, for a fixed interval of time determined by timer 51. Timer 51 is energized to start timing of the fixed interval upon the operation of relay A, make contact 7 of relay A closing to extend battery through the break portion of transfer contact 8 of relay B to timer 51. Upon completion of the timing interval, timer 51 provides a signal on lead 52 to operate timeout relay TO.

However, if prior to the operation of timeout relay TO a call is placed to the telephone number associated with line 22 and ringing current is applied to line 22 and detected by ring detector 80, lines 21 and 22 are cut through to station set 10. Thus, detection of ringing current on line 22 operates ring detector relay RD, its transfer contact 1 extending ground through the make portion thereof, through make contact 2 of relay C, the break portion of contact 7 of relay B and the winding of relay B to battery. Relay B is energized, its transfer contact 7 operating to provide a holding path through break contact 1 of timeout relay TO to ground. Transfer contacts 1 and 2 of relay B operate to cut tip and ring leads T1 and R1 of line 21 through to station leads T and R, disconnecting private line leads TT1 and RR1 therefrom. Transfer contacts 3 and 4, along with transfer contacts 5 and 6, of relay B operate to cut leads T2 and R2 of line 22 through to station leads T′ and R′, disconnecting private line leads TT2 and RR2 therefrom. The operation of transfer contacts 5 and 6 of relay B also trips ringing on line 22 and disconnects ring detector 80 therefrom.

Cut-through of lines 21 and 22 to station set 10 and the application of carrier thereover terminates the line failure signal on lead LF, releasing relay LFR and opening its contact 2 in timing circuit 50. Concurrently, transfer contact 8 of relay B operates in timing circuit 50, terminating the timing operation of timer 51 and preparing a path for later energization of timer 51 should the backup lines fail.

A visual indication of the connection of station set 10 to the backup lines is provided by light-emitting diode 65 in control circuit 60. When relay B operates to cut station set 10 through to the backup lines, make contact 9 closes to complete a path for energizing diode 65.

Subsequent termination of the backup line connections by the calling station hanging up, or due to other failure of the backup lines, results in automatic restoration of the station set connection to private line 11. In the case of such termination or failure of one or both of lines 21 and 22, station set 10 extends a line failure signal over lead LF, energizing relay LFR in detector 40. Closure of make contact 2 of relay LFR extends battery through the make portion of transfer contact 8 of relay B to timer 51. Timer 51 is thereby energized and upon completion of its timing interval operates timeout relay TO. The operation of timing circuit 50 in this manner provides a fixed interval of delay before disconnecting from the backup lines, thus guarding against disconnection due to momentary failure of the backup lines.

When timeout occurs, break contacts 1 and 2 of timeout relay TO operate to open the holding paths for relays A, B and C in control circuit 60. Release of relays A, B and C restores switching circuit 30 to normal, disconnecting station set 10 from lines 21 and 22, extinguishing diode 65 and reconnecting set 10 to private line 11.

Although the illustrative embodiment described above contemplates the detection of incoming calls over the backup lines via detection of ringing current applied thereto, it will be appreciated that other signals may be applied to one or both of the backup lines and detected by switching circuit 30 for this purpose.

Further, it will be appreciated that one or both of the backup lines may be dialed up from station set 10, if desired in a particular application. For example, the backup facilities may include a conventional automatic dialing arrangement responsive to the line failure signal on lead LF for dialing up the backup lines to the central station. Alternatively, an automatic dialing arrangement at station set 10 may be operative in response to the detection (via operation of relay A) of an incoming call on one backup line for dialing up the other backup line to the central station.

It is to be understood, therefore, that the above-described arrangements are merely illustrative of the principles of the present invention. Numerous other arrangements may be devised by those skilled in the art without departing from the spirit and scope of the invention.

What is claimed is:

1. Backup facilities for a station normally connected to a four-wire transmission line, said backup facilities using a pair of two-wire transmission lines and comprising, switching means operable for disconnecting said station from said four-wire line and connecting said station to said pair of two-wire lines, and means operative only upon failure of said four-wire line for operating said switching means automatically in response to a predetermined sequence of signals on said pair of two-wire lines.

2. Backup facilities in accordance with claim 1 wherein said circuit means includes means operative for detecting a first signal on one of said two-wire lines and, responsive to detection of said first signal, operative for detecting a second signal on the other of said two-wire lines.

3. Backup facilities in accordance with claim 2 wherein said circuit means further includes means responsive to detection of said first signal for defining a fixed interval of time, and means for operating said switching means in response to detection of said second signal within said fixed interval of time.

4. Backup facilities in accordance with claim 1 wherein said circuit means comprises means operative upon failure of said four-wire line for detecting a first predetermined signal on one of said two-wire lines, means responsive to detection of said first predetermined signal for defining a fixed interval of time, means operative during said fixed interval of time for detecting a second predetermined signal on the other of said two-wire lines, and means responsive to detection of said second predetermined signal for operating said switching means.

5. A switching circuit comprising first and second input paths, an output path normally connected to said first input path, means for providing an indication of failure of said first input path, means enabled responsive to said failure indication for detecting predetermined signals on said second input path, switching means operative for disconnecting said first input path from said output path and for connecting said output path to said second input path, and means including said detecting means for operating said switching means responsive to detection of said predetermined signals on said second input path.

6. A switching circuit in accordance with claim 5 wherein said second input path includes at least two lines, and wherein said detecting means includes a signal detector, means responsive to said failure indication for connecting said signal detector to one of said two lines, and means responsive to the detection of a predetermined signal on said one line for disconnecting said signal detector from said one line and for connecting said signal detector to the other of said two lines.

7. A switching circuit in accordance with claim 6 wherein said operating means includes means responsive to detection of said predetermined signal on said one line for defining the beginning of a predetermined time frame.

8. A switching circuit in accordance with claim 7 wherein said operating means further includes means responsive to said defining means for establishing a predetermined time frame, and wherein said operating means operate said switching means responsive to detection of a predetermined signal on the other of said two lines within said predetermined time frame.

9. A switching circuit in accordance with claim 7 wherein said operating means further includes means responsive to the termination of said predetermined time frame for disconnecting said signal detector from said other line.

10. A switching circuit operable for connecting a four-wire station set to a pair of two-wire lines comprising means for detecting a first signal on a predetermined one of said two-wire lines, means for detecting a second signal on the other of said two-wire lines, and control means for operating the switching circuit only in response to detection of said first and second signals in a predetermined sequence and within a predetermined time of one another.

11. The method of using a pair of two-wire transmission lines for providing four-wire transmission facilities for a station comprising the steps of, enabling the detection of a predetermined signal on one of said two-wire transmission lines, defining a predetermined interval of time responsive to detection of said predetermined signal on said one line, detecting a predetermined signal on the other of said two-wire transmission lines, and connecting said station to said pair of lines responsive to detection of said predetermined signal on said other line within said predetermined interval of time.

* * * * *